United States Patent
Zachae

[15] 3,646,698
[45] Mar. 7, 1972

[54] SIGNALLING DEVICE FOR A FISHING LINE

[72] Inventor: Gottfried Zachae, 23 Pratt Street, Norwich, Conn. 06360

[22] Filed: Oct. 8, 1969

[21] Appl. No.: 864,824

[52] U.S. Cl. .................................................. 43/17, 43/27.4
[51] Int. Cl. .......................................................... A01k 97/12
[58] Field of Search .............................................. 43/17, 16

[56] References Cited

UNITED STATES PATENTS

| | | | |
|---|---|---|---|
| 1,995,067 | 3/1935 | Killory | 43/16 |
| 2,565,379 | 8/1951 | Laurila | 43/17 |
| 1,162,257 | 11/1915 | Ruggles | 43/17 |

*Primary Examiner*—Samuel Koren
*Assistant Examiner*—Daniel J. Leach
*Attorney*—Max Schwartz

[57] ABSTRACT

A device which can be mounted on a stake embedded in the ground or mounted in the oarlock holder on a rowboat comprising a slidable member which serves to retain the signalling device in a spring tension position. The slidable member also holds the line from the end of the rod to the hook in confinement. When the fish pulls on the hook and line the slidable member releases the line and this releases the spring tension device which springs upwardly to provide the necessary signal.

8 Claims, 4 Drawing Figures

PATENTED MAR 7 1972
3,646,698
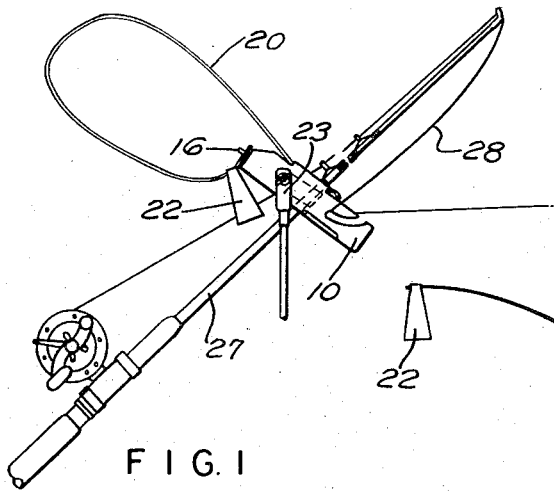
FIG. 1
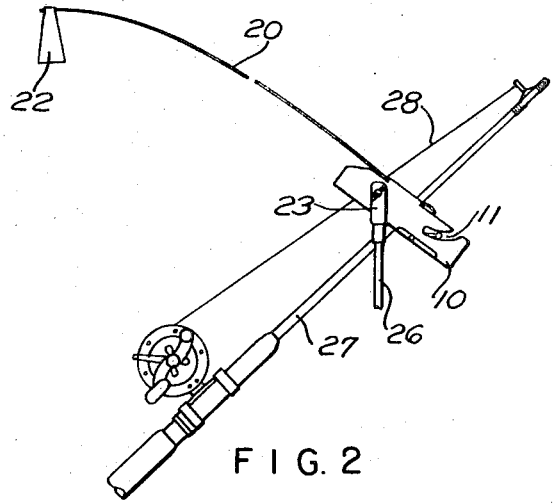
FIG. 2
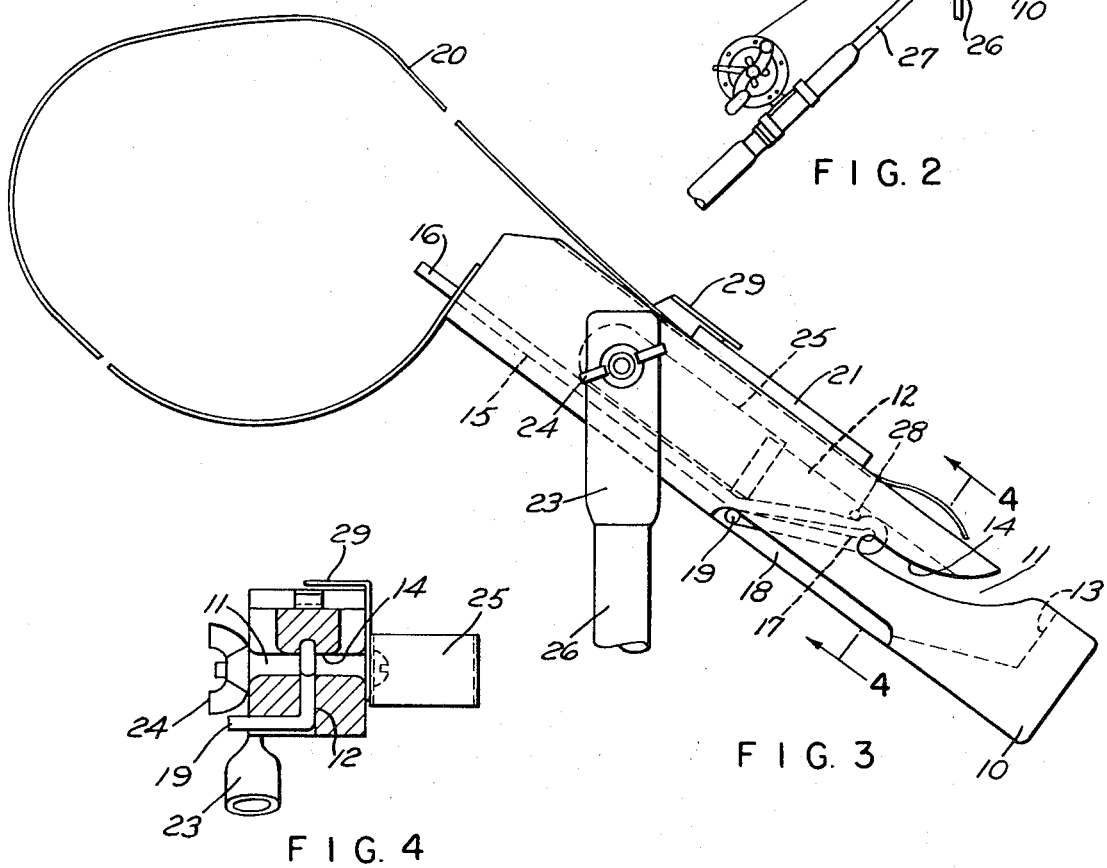
FIG. 3
FIG. 4
INVENTOR
GOTTFRIED ZACHAE
BY Max Schwartz
ATTORNEY

SIGNALLING DEVICE FOR A FISHING LINE

My present invention relates to fishing devices and more particularly to a signalling device for signalling when the hook has been taken by a fish.

The principal object of the present invention is to provide a signalling device which can readily be mounted on the rowboat or on shore for providing the necessary signal to the fisherman.

Another object of the present invention is to provide a fishing signalling device which immediately releases the fishing line when the bait is taken by a fish.

A further object of the present invention is to provide a fishing signalling device in which the signalling device is under constant spring tension which is released by pull of the fish on the line.

Another object of the present invention is to provide a fishing signalling device which is made in a compact form so that the fisherman can readily carry it in his pocket.

A further object of the present invention is to provide a fishing signalling device which is simple in construction and easy and economical to manufacture and assemble.

With the above and other objects and advantageous features in view, my invention consists of a novel arrangement of parts, more fully disclosed in the detailed description following, in conjunction with the accompanying drawings and more particularly defined in the appended claims.

IN THE DRAWINGS

FIG. 1 is a side elevation of the device embodying my present invention in line-holding position.

FIG. 2 is a view similar to FIG. 1 with the signal showing a fish on the line.

FIG. 3 is an enlarged side elevation of the device as shown in FIG. 1.

FIG. 4 is a section taken on line 4—4 on FIG. 3.

The device of the present invention is particularly designed to be attached to a line from a pole and reel arrangement. Therefore, when the fish triggers the device to signal the attachment to the line, it is essential that the line be immediately released so that the fisherman can grasp the pole immediately and begin playing the fish. The device is also designed to be mounted not only on a stake in the ground but also on a rowboat by mounting it in the oarlock holder.

Referring more in detail to the drawings, the device of the present invention comprises an elongated base 10 made of wood or plastic material and fairly light. As can be seen in FIG. 3, the block 10 is provided with a curved slot 11 extending from the upper edge adjacent the rear end and curving downwardly and forwardly. The center of the block is provided with a slot 12 which extends vertically through the block from the slot 11 along the dotted lines 13 shown in FIG. 3. It should be noted that the upper side of the slot 11 is also provided with a central slot or groove 14 for a purpose hereinafter to be described.

I now provide the block 10 with a horizontal elongated opening 15 which extends from the front end rearwardly into the slot 12. An elongated pin 16 is slidably mounted in the opening 15 and is of such length that the forward end extends outwardly from the front end of the block 10 as shown in FIG. 3. The rear end is bent upwardly and downwardly into a double thickness at 17 and at an angle upwardly so that it extends into the upper groove 14 in its foremost position. The bottom of the block 10 is provided with a cutout portion 18 and the free end of the pin 16 is bent laterally at 19, see FIG. 4, and extends into the cutout portion 18.

With the above construction, it is obvious that the laterally extended portion of the pin at 19 can be engaged by a finger and moved rearwardly in the cutout portion 18. This will withdraw the front end of the pin 16 into the block 10, and simultaneously, the doubled U-bend 17 of the pin will slide rearwardly into the rear portion of the vertical slot 12 against the wall thereof to clear the slot 14. The signalling device comprises a flat elongated spring 20 which is mounted on the top of the block by means of a thin plate 21. The front end of the spring 20 is provided with a small flag or other signalling member 22. The front tip of the spring 20 is provided with an opening which allows it to be slipped over the end 16 of the pin and puts the spring under a curved tension as shown in FIG. 1.

With the parts assembled as hereinabove described, it is obvious that when the pin 16 is moved rearwardly into withdrawn position it will release the free end of the spring 20 and allow it to snap upwardly into the position shown in FIG. 2. The device is mounted by the arrangement adjacent the forward end in which a socket member 23 is pivotally mounted on a wingnut and -bolt arrangement 24 which also holds a flat plate 25 on the opposite side. The angle of the socket portion 23 and the plate 25 can always be adjusted to accommodate the position in which the angler wishes to hold the device. The member 23 may be provided with an elongated portion 26 adapted to be inserted in the oarlock holder of a rowboat. This permits the device to be mounted right on the rowboat itself. The pole 27 can be rested on the plate 25 at an angle as shown in FIG. 1. The line 28 extends from the reel upwardly to the tip of the pole and then downwardly towards the hook and the fish.

When the device is being mounted, the angler casts the line 28 outwardly from the boat in the usual manner. The pole is then rested on the plate 25 and the line 28 is brought through the slot 11. The pin 16 is now grasped by its extended member 19 and moved forwardly so that the portion 17 engages the line and holds it in the slot 14 in the position shown in FIG. 3. The spring 20 is now bent so that its forward end can be slipped over the extended portion of the pin 16. As can be seen in FIG. 3, the U-bend 17 is provided with a notch at the top in which the line 28 nests. This serves to retain the line in the slot, especially in the smaller sizes. It is thus obvious that when a fish grabs the hook and pulls it, the tension on the line 28 will pull the pin 16 rearwardly and release the spring 20 so that it snaps upwardly into the position shown in FIG. 2. This pull is assisted by the notch in which the line rests. The line also immediately slips out of the wide slot 11 and allows the angler to grasp the pole and play the fish without worrying about entanglement with the device.

While the extended portion 26 is designed to fit into an oarlock, a telescopic or other type of rod which has short portions which can be threaded into each other can readily be mounted on the device for providing a stake to be pushed into the ground on the shore. These stakes and extended portions are preferably made in sections so that the fisherman can readily disassemble the unit and place it into his pocket or any small carrying case. It should also be noted that the top of the device is provided with a hook portion 29 so that when carrying the device the spring may be turned into a reverse angle and pushed under the portion 29 to form a small compact package. The device is simple in construction and easy and economical to manufacture and assemble. It will not interfere with the fishing pole or line and is easily packed and used.

Other advantages of the present invention will be readily apparent to a person skilled in the art.

I claim:

1. A signalling device for a fishing line comprising a base, an elongated flat spring having one end mounted on said base, said spring extending beyond the front end of said base and being normally biased to signalling position, said spring being bendable to position the free end thereof against the front end of said base, the said free end having an aperture therein, said base having a longitudinal slot and an opening extending longitudinally through the base from the said slot through the forward end thereof, and means slidable in said slot for releasably retaining a fishing line in said slot, said means including an elongated pin slidable in said opening and extending beyond the front end of said base to releasably engage the said aperture in the spring to retain the free end of said spring in coiled position when said means is in fishing-line-retaining position, whereby tension on the fishing line by a hooked fish will cause said means to be moved in said slot and opening to release said line and the said pin from the said spring aperture to cause the said spring to be biased to signalling position.

2. A signalling device for a fishing line comprising a base, an elongated flat spring having one end mounted on said base, said spring extending beyond the front end of said base and being normally biased to signalling position, said spring being bendable to position the free end thereof against the front end of said base, the said free end having an aperture therein, said base having a longitudinal slot and an opening extending longitudinally through the base from the said slot through the forward end thereof, and means slidable in said slot for releasably retaining a fishing line in said slot, said means including an elongated pin slidable in said opening and extending beyond the front end of said base to releasably engage the said aperture in the spring to retain the free end of said spring in coiled position when said means is in fishing-line-retaining position, whereby tension on the fishing line by a hooked fish will cause said means to be moved in said slot and opening to release said line and disengage the said pin from the said spring aperture to cause the said spring to be biased to signalling position, the rear end of said pin being bent at an upward angle to form a double thickness extending into said slot and having a portion extending laterally from beneath said base to form a manually engageable portion.

3. A signalling device as in claim 1, wherein said base comprises an oblong member having a transverse slot extending from an upper end downwardly and arcuately forwardly, said means retaining the fishing line in said longitudinal slot.

4. A signalling device as in claim 2, wherein said base comprises an oblong member having a transverse slot extending from an upper end downwardly and arcuately forwardly, said means retaining the fishing line in said longitudinal slot.

5. A signalling device for a fishing line comprising a base, an elongated flat spring having one end mounted on said base, said spring extending beyond the front end of said base and being normally biased to signalling position, said spring being bendable to position the free end thereof against the front end of said base, the said free end having an aperture therein, said base having a longitudinal slot and an opening extending longitudinally through the base from the said slot through the forward end thereof, and means slidable in said slot for releasably retaining a fishing line in said slot, said means including an elongated pin slidable in said opening and extending beyond the front end of said base to releasably engage the said aperture in the spring to retain the free end of said spring in coiled position when said means is in fishing-line-retaining position, whereby tension on the fishing line by a hooked fish will cause said means to be moved in said slot and opening to release said line and disengage the said pin from the said spring aperture to cause the said spring to be biased to signalling position, said base having a transverse nut-and-bolt arrangement, a shelf for holding a fishing pole angularly adjustably held on one side of said base by said bolt, and mounting means angularly adjustably held on the opposite side of said base by said bolt.

6. A signalling device as in claim 5, wherein said mounting means includes a short pin for mounting in the oarlock holder of a rowboat.

7. A signalling device as in claim 5, wherein said mounting means includes a sectional stake for mounting on shore.

8. A signalling device as in claim 4, wherein said base is provided with a transverse nut and bolt arrangement, a shelf for holding a fishing pole angularly adjustably held on one side of said base by said bolt, and mounting means angularly adjustably held on the opposite side of said base by said bolt.

* * * * *